United States Patent [19]

Lotterbach et al.

[11] Patent Number: 4,700,305
[45] Date of Patent: Oct. 13, 1987

[54] POSITION DISPLACEMENT AND SPEED SENSOR SYSTEM, PARTICULARLY FOR COMBINATION WITH AN AUTOMOTIVE ENGINE CONTROL COMPUTER

[75] Inventors: Gerhard Lotterbach, Markgröningen; Manfred Schenk, Schorndorf; Udo Zucker, Güglingen; David Van Belzen, Hemmingen; Jan F. van Woudenberg, Markgröningen, all of Fed. Rep. of Germany

[73] Assignee: Robert Bosch GmbH, Stuttgart, Fed. Rep. of Germany

[21] Appl. No.: 874,796

[22] PCT Filed: May 28, 1983

[86] PCT No.: PCT/EP83/00153
§ 371 Date: Jan. 17, 1984
§ 102(e) Date: Jan. 17, 1984

[87] PCT Pub. No.: WO83/04283
PCT Pub. Date: Dec. 8, 1983

Related U.S. Application Data

[63] Continuation of Ser. No. 584,944, Jan. 17, 1984, abandoned.

[30] Foreign Application Priority Data

Jun. 3, 1982 [DE] Fed. Rep. of Germany ....... 3220896

[51] Int. Cl.⁴ ................................................. F02P 5/08
[52] U.S. Cl. ............................... 364/431.03; 123/414; 123/416; 364/431.05
[58] Field of Search ...................... 364/431.03, 431.05; 123/414, 416, 417, 418, 480, 486; 324/169, 173, 392

[56] References Cited

U.S. PATENT DOCUMENTS

| | | |
|---|---|---|
| 3,696,303 | 10/1972 | Hartig . |
| 3,930,201 | 12/1975 | Ackermann et al. . |
| 4,181,884 | 1/1980 | Shirasaki et al. ................ 123/414 |
| 4,322,800 | 3/1982 | Hisegawa et al. ............ 364/431.05 |
| 4,356,447 | 10/1982 | Honig et al. ..................... 324/392 |
| 4,365,602 | 12/1982 | Stiller et al. ..................... 123/414 |
| 4,442,822 | 4/1984 | Kondo et al. .................... 123/414 |

FOREIGN PATENT DOCUMENTS

| | | | |
|---|---|---|---|
| 2748663 | 5/1979 | Fed. Rep. of Germany | 123/416 |
| 3017971 | 11/1981 | Fed. Rep. of Germany | 123/414 |
| 3045716 | 7/1982 | Fed. Rep. of Germany | 123/414 |
| 2445511 | 7/1980 | France . | |
| 0062364 | 4/1983 | Japan | 123/414 |
| 1410782 | 10/1975 | United Kingdom | 123/416 |

Primary Examiner—Parshotam S. Lall
Attorney, Agent, or Firm—Frishauf, Holtz, Goodman & Woodward

[57] ABSTRACT

To provide control of a vehicle engine computer from a segmental disk transducer by indicating a specific marker angular position of the crankshaft, to, characterize a specific cylinder in a multi-cylinder engine, the disk (1) has uniformly spaced segments (10, 20, 30, 40) thereon, the number of segments corresponding to the number of cylinders; one of the segments is foreshortened, so that the passage of the leading flank (11) thereof past a stationary pick-up transducer (2) will occur at a time later than that of the leading edges or flanks (21, 31, 41) of the remaining segments. The trailing flanks (12, 22, 32, 42) of all the segments are identical, and signals derived by processing the trailing flanks can be used to obtain speed signals; by processing the leading flanks, interrupt signals are applied to an interrupt input (3f) of a vehicle computer (3) to initiate a subroutine or subprogram. Additionally, a clock is started which, by counting, stores a representation of the circumferential length of the largest one of the segments. The length representation, as stored, is compared with a subsequent count in a comparator (9) and, if the counts do not match, this indicates that the then-appearing segment before the pick-up is the one which is foreshortened. The counter is reset upon sensing each trailing flank, and the memory, likewise, is reset each time a new count is entered thereinto.

14 Claims, 2 Drawing Figures

POSITION DISPLACEMENT AND SPEED SENSOR SYSTEM, PARTICULARLY FOR COMBINATION WITH AN AUTOMOTIVE ENGINE CONTROL COMPUTER

This application is a continuation of application Ser. No. 584,944, filed Jan. 17, 1984, now abandoned.

The present invention relates to a sensor to sense displacement or speed, typically displacement of a shaft, that is, its angular rotation, speed of the shaft, but may also be used as a sensor to determine linear displacement, and linear speed of one element with respect to another. The sensor is particularly adapted to determine the angular position of the crankshaft of an internal combustion engine—or of a shaft rotating in synchronism therewith, for example the camshaft—and the particular position of the shaft with respect to a reference, typically top dead enter (TDC) position of a predetermined one of a group of cylinders in a multi-cylinder internal combustion (IC) engine.

BACKGROUND

Ignition systems, and other control systems used in combination with internal combustion (IC) engines, such as fuel injection systems, and the like, utilize sensors which provide output signals characterizing the respective instantaneous position of the crankshaft or of the camshaft, respectively, of the engine. Two types of sensors are customarily used. One type is the incremental sensor. It is usually either a star disk, or a gear, for example the gearing of the starter gear, in which a plurality of projections or gear teeth are uniformly distributed with intermediate uniform gaps. The number of the teeth is counted, starting from a predetermined reference tooth. Any angular position of the crankshaft or the camshaft, respectively, can thus be determined by counting the teeth from the reference tooth. Thus, an ignition instant can be calculated to provide proper ignition timing for the IC engine. To provide a reference, the incremental sensors may use separate reference markers. It has also been proposed to provide a gear, in which one of the teeth is formed in a shape which differs from that of the others, so that, in this particular manner, a reference tooth can be characterized, that reference tooth then forming a reference marker. Such an arrangement is described in the German Patent Disclosure Document DE-OS No. 29 39 643.

In operation, incremental sensors operate satisfactorily. Upon starting, however, defining a predetermined ignition instant is possible only after some dead time has elapsed, which will depend on the position of the marker tooth when the engine was previously shut down with respect to a fixed sensor. Thus, counting of the teeth, and hence providing predetermined ignition signals, can commence only after the reference marker, or marker tooth, has passed the sensing element. In dependence on the instantaneous position of the reference marker, more or less time will elapse after re-starting of an engine until proper operation of the incremental sensor is possible.

Another type of sensor is the segmental sensor, in which a transducer disk is provided which carries a plurality of elongated segmental portions at the circumference thereof. The number of the segmental portions corresponds to the number of the cylinders of the internal combustion engine when the segments are secured to the camshaft of the engine. When the segments, or the segmental disk, are secured to the crankshaft of the engine, then the number of segments corresponds to half the number of cylinders, since the crankshaft, as is well known, rotates at half the speed of the camshaft. The segments cooperate with a fixed transducer element which senses the leading and trailing flanks of the segments to thereby sense the length of the respective segments. The leading flank of the segments customarily is shifted with respect to the position corresponding to the top dead center (TDC) position of the pistons of the IC engine. The ignition timing, thus, can readily be defined within the timing period determined by the length of the segments. No specific reference marker is needed for the segmental sensors in order to determine the ignition timing, since the segments are associated with respective cylinders.

For some purposes, it is desirable to provide a signal representative of a particular reference cylinder. Thus, it is also desirable to provide a reference marker with segmental systems, and preferably, to secure the segmental disk on the camshaft.

It has been proposed to insert in the gap between segments an additional tooth or projection which is offset with respect to one of the segments and when the short or additional tooth passes the transducer element, in order to clearly define one of the segments, analyzing the signals derived from the short or additional tooth segments and the normal or long segments. Such a system is described, for example, in German Patent Disclosure Document DE-OS No. 28 54 017.

Use of a segmental sensor thus can provide a defined angular position of the camshaft. If such a segmental sensor is used in combination with a program controlled computer circuit which, for example, is a microcomputer controlling the ignition system of the IC engine combined with a motor vehicle, difficulties have been encountered since the additional leading and trailing flanks of the marker tooth will also affect the calculations of the program controlled computer. In a normal program controlled computer, the leading and trailing flanks are evaluated as asynchronous events, and applied to an interrupt input of a microcomputer. Occurence of any interrupt signal causes switch-over of the computer to enter a subroutine or a subprogram. An additional marker tooth, which will generate its own leading flank and trailing flank in the fixed sensor, can be sensed. In order to prevent the additional marker tooth, however, from affecting the normal program of the vehicle computer, substantial additional programming is necessary, which requires further memory address locations and substantial expansion of the memory capability of the computer. Thus, use of such an additional marker tooth is undesirable when an automotive-type computer is to be controlled thereby.

THE INVENTION

It is an object to provide a transducer of the segmental type which can readily be associated with a computer to generate output signals based on signals derived from the sensor, and recognized marker signals without requiring substantial additional hardware elements or complex additional programming and the associated memory capacity.

Briefly, the sensor provides a group of essentially uniformly spaced, identical segments, or interrupted projections and gaps, for example in the form of a segmental disk. The segments can be scanned by a fixed element of the transducer, for example an inductive pick-up, an optical pick-up, or the like, to provide output signals having, respectively, leading and trailing flanks. The leading and trailing flanks of the segments are associated with predetermined positions of the piston of the IC engine, for example a selected angle in advance of TDC position of the piston. The one marker element, which forms a reference marker element, which has a length which differs from the uniform group of marker elements, can be recognized by a simple recognition circuitry, for example by starting a counter each time the leading flank of a marker element is sensed and comparing the resulting counts with a preceding count. If the counts are the same, then the marker elements are the ones which are of the uniform type; if the count differs, that is, in the example if the count is smaller, then this one is the reference marker element. Thus, a special signal characterizing that one as the reference marker element can be provided. Yet, the sequence of operation of the computer has not changed - that is, each leading flank causes an interrupt signal to be generated, and the trailing flank can then cause other computation steps, in accordance with any predetermined and well known operating program.

In accordance with a feature of the invention, the respective elements are segments on a disk, in which one of them, the one forming the reference segment, has a leading flank which is shifted by an angle of between about 2° to 5° of crankshaft rotation with respect to the leading edge of the remaining segments which form the group of uniform segments. The trailing flanks of the segments are all at the same respective angular positions with respect to the crankshaft positions of the piston. The fixed sensor, which senses the passage of the segments, provides respectively different signals when the leading and trailing flanks pass—for exsample, if it is an inductive sensor, signals of different polarity; or, if it is an optical sensor, signals which differ if the optical sensor senses changes from bright to dark, or from dark to bright—again, for example, providing respective output signals of different polarity, which can readily be obtained from any one of well known sensors by differentiation. Sensing, then, the signals from the trailing edges of the segments, which are uniformly distributed, readily permits determination of the speed of the shaft, and hence of the engine.

When combined with an IC engine, the segments are preferably so arranged that the leading flank passes the fixed sensor or transducer element at an instant of time which is always in advance of the earliest possible ignition instant; and the trailing flank corresponds to an instant of time later than TDC position of the associated piston as the engine rotates. Preferably, the segmental disk is coupled to the camshaft of the engine.

The sensor has the advantage that it can readily be used with a standard program controlled automotive computer system requiring only minimum additional programming, yet permits recognition of a specific segment as a reference marker segment. Thus, a specific cylinder can be marked, or characterized, and a specific cylinder marking used in ignition systems having program controlled engine computers with only minimum additional hardware and software requirements.

Obtaining a separate signal marking a specific cylinder is of particular advantage in automotive IC engines installed in automotive vehicles in which a predetermined number of cylinders is inhibited from operating when the engine operates under engine braking condition, that is, when the wheels drive the engine, rather than the engine driving the wheels. Such systems are used, for example, in multi-cylinder engines of the six— and more—cylinder types, in which only a predetermined group of cylinders continues to operate, the remaining ones being disabled from providing power when the vehicle is operating under engine braking conditions. In such systems, it is necessary to provide fuel to those cylinders which are to continue to operate, but to inhibit fuel supply to those cylinders which are to be disabled from supplying power. The sensing system can control a suitable program controlled computer particularly simply and economically, with a minimum of additional hardware and software requirements.

In accordance with a preferred embodiment of the invention, the trailing flanks of the groups of segments are all located in the same distance with respect to the TDC position of the pistons of the IC engine. This permits immediate generation of speed signals upon starting of the engine by counting, with respect to time, the occurrence of trailing edge to trailing edge, and thus obtain speed information immediately upon starting of the IC engine.

For automotive applications, it is preferred to use a fixed transducer element which either operates magnetically or optically, to scan the segments of a segmental scanning disk which is coupled to the camshaft of the engine.

The system can be used not only to control ignition or fuel supply to IC engines; it can be used, in general, for measuring and evaluation, for example to sense angular positions, speeds, or displacements, either linear or rotary, in addition to obtaining a specific signal of a predetermined reference position. Measuring displacements—linear or rotary—with respect to a reference occurs not only in automotive-type engines, but also in other applications, for example in numerically controlled machine tools, packaging machinery and the like; the system is additionally particularly applicable for servo drives of different types, and especially in those in which a periodic rotation or oscillation is to be sensed and evaluated by obtaining an electrical signal which, in turn, can be used to control suitable signal analysis apparatus.

In the specification and claims, the term "leading edge" and "trailing edge", or "leading flank" and "trailing flank", as the case may be, refers to the relative position of the respective flank or edge of a segment or signal upon relative movement, for example rotation, of the segmental or interrupted element with respect to a fixed element, for example a fixed transducer element.

DRAWINGS

DETAILED DESCRIPTION

Figure 1:
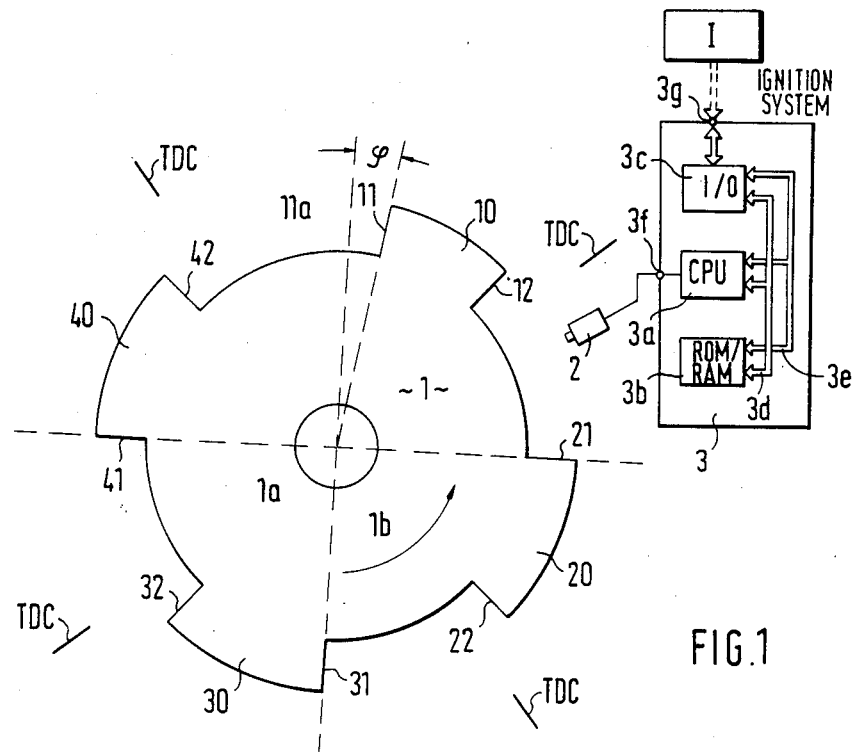
FIG. 1 is a general schematic part block diagram of the system.

A segmental disk 1 (FIG. 1) is coupled to the camshaft of an IC engine, and rotates therewith. The camshaft is shown only schematically at 1a. The segmental disk 1 forms one of the elements of the system. A fixed transducer element 2 is located in interacting position with the segmental disk 1. It interacts with the segments 10, 20, 30, 40 projecting from the segmental disk 1, and located at the circumference thereof. Upon rotation of the segmental disk as indicated by the arrow 1b, for example in counter-clockwise direction, the leading flanks 11, 21, 31, 41 of the segments 10, 20, 30, 40 pass the fixed element or pick-up 2, and cause occurrence of a signal therein; a different signal, for example one of reverse polarity, will occur when the trailing flanks 12, 22, 32, 42 of the segments 10, 20, 30, 40 pass the pick-up 2.

The leading flanks 21, 31, 41, of the segments 20, 30, 40 are equidistantly positioned around the circumference; in accordance with a feature of the invention, the leading flank 11 of the segment 10 is offset, however, by an angle φ with respect to a theoretical ine 11a which would conform to an equidistant leading flank. The trailing flanks 12, 22, 32, 42 are all equidistant from each other. The leading flanks as well as the trailing flanks are shifted with respect to TDC position by a predetermined angle. The TDC positions are shown schematically in FIG. 1. The respective flanks are so arranged that the leading flanks 11, 21, 31, 41 correspond to a predetermined "advance" time instant, and the trailing flanks 12, 22, 32, 42 corresond to a predetermined "retarded" time instant, always with reference to an ignition instant, or the timing of an ignition event in the IC engine.

The interaction of the segments 10, 20, 30, 40 with the pick-up 2 can be obtained in various ways, all of which are known per se. The interaction, for example, may be magnetic, in which case the element 2 is a magnetically responsive pick-up, for example an inductive sensor, a Hall sensor, a Wiegand sensor, or the like. The segments 10, 20, 30, 40 then will be made as elements which use ferromagnetic sheet metal or the like, or which are constructed as shielding elements to interrupt an external magnetic field. The pick-up, of course, can also be arranged for optical interaction with the disk 1; for such an arrangement, the segments 10, 20, 30, 40 will be formed as shutters which respectively interrupt or permit passage of a light beam arranged between a light source and a light responsive pick-up. The pick-up 2, thus, can be constructed in accordance with any suitable and well known arrangement, for example for optical pick-up, as a photo transistor, photo diode or the like. Of course, other known physical effects which provide for interaction of the segments 10 . . . and the pick-up 2 are also possible.

The element 2, in accordance with well known arrangements in vehicle computers, is connected to an interrupt input 3f of a program controlled vehicle computer 3. The program controlled computer 3, in the example of FIG. 1, includes a microcomputer controlled ignition system which, in a well-known manner, has a central processing unit 3a, memory elements 3b, which may include a read-only memory (ROM) and a random access memory (RAM). Further, the computer 3 has an input/output unit (I/O) 3c. The respective internal units are interconnected by a data bus 3d and an address bus 3e, in well known configuration. Control of accessory and subsidiary units, as well as external systems such as the actual ignition system components, e.g. ignition coils, spark plugs, and the like, is effected over the I/O terminal 3g. Such external components are not shown since they are standard in the field. The ignition system is schematically indicated by a block I.

Operation: A program is caused to run in the program controlled unit 3 in order to control the ignition system I to provide control pulses for ignition events to operate the IC engine. When one of the leading flanks 11, 21, 31, 41 passes the pick-up 2, a signal is generated in the pick-up 2 and is connected to the interrupt input 3f of the computer 3. Upon sensing this interrupt signal, the then running program is interrupted, and a subprogram or subroutine is called up, which, for example, will calculate the circumferential dimension or length of one of the segments 10, 20, 30, 40. The end of the segement causes another signal in the pick-up 2. No new interrupt signal will be applied, however, since the end-of-flank signal will have a reverse polarity. The end-of-flank signal can be recognized by a suitable polarity recognition network—for example including a diode—connected in a holding loop circuit of the computer 3 to cause the computer to operate in accordance with its program, for example as established in accordance with well known prior art systems.

Figure 2:
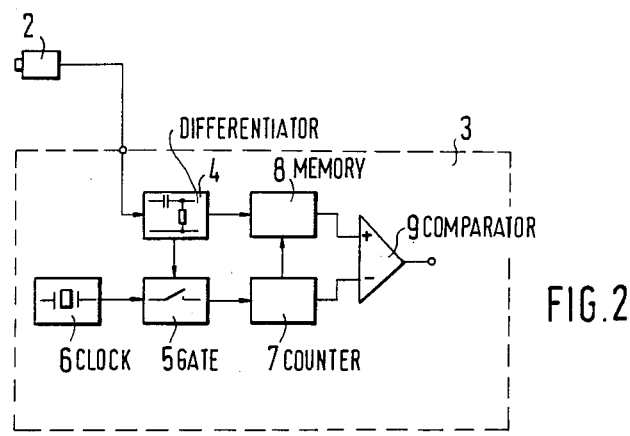
FIG. 2 is a block circuit diagram also showing the operative portion to evaluate the signals from the system.

FIG. 2 illustrates, in block circuit diagram, the details of the preceding operation. The elements therein may be partly included within the unit 3, or may be external thereto; they are shown in FIG. 2 within the unit 3 only for illustration to describe, in detail, those few components which are necessary to determine the circumferential length of the segments 10, 20, 30, 40.

Referring to FIG. 2: The signal from the pick-up element 2 is applied to a differentiator 4 which controls a gating circuit or switch 5. A clock generator 6 is connected to a counter 7, the clock pulses being respectively controlled to be counted in accordance with the gating or switching position of the gate 5. The counter 7 is connected to one input of a comparator 9. The counter 7 is additionally connected via a memory 8 to a second input of the comparator 9. In the example shown, the counter 7 is connected to the inverting input of an operational amplifier, and the memory 8 to the direct input thereof. The operational amplifier is connected as a comparator in accordance with well known operational amplifier circuitry.

Operation, circuit of FIG. 2: Upon sensing a leading flank or leading edge 11, 21, 31, 41 of the segmental disk 1, the pick-up 2 will have a signal applied thereto which, upon differentiation, controls the gate 5 to pass pulses; upon occurrence of the respective trailing flank 12, 22, 32, 42, the switch 5 will open, so that transfer of pulses from the clock 6 to the counter 7 is inhibited. Upon occurrence of a trailing flank, the contents of the counter 7 are simultaneously transferred into the memory 8, and the counter 7 is reset. The connection between the differentiator and the memory is useful for synchronization purposes. The comparator 9, thus, at the termination of any count event, can carry out the comparison between the length of the respectively sensed segments and the length of the immediately preceding segment.

Let it be assumed that the segment 40 is first sensed. The memory 8 will have a number therein which corresponds to the length of the segment 40. Counter 7, at the termination of the passage of the segment 10, will, however, have a smaller count number therein since the segment 10 is of shorter length. The comparison is carried out upon occurrence of the trailing flank or edge 12, before transfer from the counter 7 into the memory 8 and reset of counter 7 is carried out. The comparator will provide an output signal, for example in binary form, which indicates a difference, so that, upon occurrence of the trailing flank 12, a signal is obtained from the comparator 9 which indicates that the segment 10 is that one which was the reference segment. This information can be used to trigger ignition events, or fuel injection events, or control other processes by transfer through the I/O port 3g, without in any way interfering with other operations of the signals from the segmental disk 1 in any way. No change in programming of the unit 3 for the specific segmental disk 1 is necessary.

Of course, the polarity of the just described process can be reversed, and the length of the gaps between segments sensed, by making a comparison for, respectively, the time difference between leading flanks and resetting the counter 7 upon occurrence of a leading flank.

The system can be used to control ignition events, or fuel injection events, in automotive engines used in automotive vehicles; the example illustrated in connection with FIG. 1 is only one of the many applications possible. The sensor can be used for all types of measuring problems in which repetitively occurring events are sensed, for example angles, speeds, distances, and the like, and in which a specific reference position or a plurality of reference positions along a linear path, or a reference angular position along a circular path, is to be distinguished from other cyclically occurring events along the path.

The leading flank 11 of the segment 10 is preferably offset by an angle of between 2° to 5° of crankshaft angle with respect to the leading flanks of the segments 20, 30, 40. This is particularly suitable for automotive-type IC engines.

Various changes and modifications may be made within the scope of the inventive concept.

Of course, the segments can be considered as the solid elements, as shown in FIG. 1; likewise, the segements can be considered as the gaps between the solid elements 10, 20, 30, 40. If so considered, and for the system described, the angle $\phi$ would be symmetrically positioned to the left of the reference line 11a, assuming the same operation described in connection with a smaller length for the marker element 10, and the term "segment" as used herein may be applied equally to the gaps as well as the projecting portions of the disk or element 1.

A suitable microprocessor unit 3, which can be used in the system of the present invention, is described in the Intel publication "MCS-51 Family of Single Chip Microcomputers User's Manual", July 81, printed in USA C 219/0681/30k RRD.

What is claimed is:

1. The combination of a camshaft (1a) is an internal combustion engine (I.C.E.) and a position displacement and speed sensor system, comprising:
    a first, segmental disk, element (1) coupled to said camshaft (1a) and formed with a plurality of segments, the number of segments corresponding to the number of cylinders of said I.C.E.;
    a second, single pick-up element (2);
    said first segmental disk and second pick-up elements being positioned in interactive relationship with respect to each other and relatively movable with respect to each other, said first element having a group of identical segments (20, 30, 40), each uniformly spaced from the closest adjacent one of said identical segments,
    said pick-up element (2) responding to the passage of said segments (10, 20, 30, 40) and providing an electrical output signal representative of a trailing edge of the segment, as said first and second elements move relative to each other,
    said first, segmental disk, element (1) having a single additional, dual-purpose, reference segment (10), interspersed between said uniformly spaced segments (20, 30, 40), which corresponds to one of said cylinders for cylinder-counting and speed-determination purposes but has a circumferential length which differs from that of said uniformly spaced segments (20, 30, 40), to form a single predetermined irregularity (11), thereby defining a predetermined position on said first, segmental disk, element (1); and a program-controlled engine operating computer (3) which has
    a program interrupt input (3f),
    means (6, 7) calculating the length of the respective segments, and
    comparison means (9) for comparing the length of respective segments with a reference value; said program interrupt input (3f) receiving a sensing signal generated in said second, pick-up element (2) when said second element senses a leading edge (11, 21, 31, 41) of a respective segment, said computer (3) processing said sensing signal as a program interrupt command;
    said irregularity (11) enabling said computer (3) to distinguish the segment (10) bearing the irregularity from all other segments (20, 30, 40), while the total number of said identical segments and said reference segment does not exceed the number of said cylinders, thereby simplifying interpretation of signals from said pick-up element (2).

2. System according to claim 1, wherein the reference value comprises the length of the respectively preceding measure segment.

3. System according to claim 2, wherein the computer includes a buffer memory (8) of sufficient capacity to store a respresentation of the length of a segment passing before the second element (2);
    and a comparator (9) comparing said stored length with a subsequently occuring length, and providing a recognition output signal if the subsequently stored length has a predetermined relation with respect to a previously stored length, said memory being reset upon each comparison.

4. System according to claim 1, in combination with an ignition system (I) of a combustion engine for use in a vehicle, in which the ignition timing is controllable with respect to a reference value (TDC) wherein
    the leading edges (11, 21, 31, 41) of the segments (10, 20, 30, 40) correspond to a predetermined advanced timing of the ignition event, and the trailing edges (12, 22, 32, 42) corresond to a predetermined retarded timing with respect to said reference;
    wherein the segment having said irregularity of a length comprises a segment of lesser length than the segments of said group of identical uniformly spaced said segments, the difference in length being defined by an offset of the leading flank (11) of said additional reference segment by an angle of about 2° to 5° of crankshaft angle rotation of the engine;
    wherein the trailing edges (12, 22, 32, 42) of all said segments including said additional irregular segment are uniformly positioned with respect to said reference (TDC);
    and wherein said evaluation circuit comprises a clock generator (6) and is arranged to calculate the speed of the engine by processing the electrical output signals representative of the trailing edges of all said segments with respect to a predetermined clock rate.

5. System according to claim 1, wherein the second element (2) comprises a magnetic field responsive pick-up;

and said first element (1) comprises a segmental disk (1) having magnetically marked segments (10, 20, 30, 40).

6. System according to claim 1, wherein said second element (2) comprises an optical pick-up;

and said first element comprises a segmental shutter-type disk.

7. In combination with a multi-cylinder internal combustion engine having an ignition system (1), a camshaft (1a) and a group of cylinders operating with respect to a reference position (TDC), a sensing system, for determination of angular position of the camshaft with respect to a predetermined shaft reference position and rapid determination of the speed of said camshaft, prior to a full rotation thereof, having a segmental disk (1) rotationally coupled to the camshaft of the engine;

a stationary pick-up (2) located for generating signals upon rotation of said segmental disk (1), said segmental disk including a group of segments (10, 20, 30, 40) thereon, corresponding to the number of said cylinders and each having a first end or flank (11, 21, 31, 41) which is uniformly spaced about the circumference of said disk for all said segments (20, 30, 40) except for one (10) segment having a non-uniformly spaced first flank which serves to designate a specific cylinder, and another end or flank (12, 22, 32, 42) which is uniformly spaced around the camshaft for all said segments (10, 20, 30, 40) and serves to designate each cylinder, for cylinder-counting and speed-determination purposes, whereby said specific cylinder can be designated without providing more segments than there are cylinders, thereby simplifying interpretation of signals resulting from passage of said segments past said pick-up, said one segment which has said non-uniformly spaced flank forming a reference marker segment (10), its first flank (11) being angularly offset with respect to similar flanks (21, 31, 41) of the other segments (20, 30, 40);

wherein said first flank (11, 21, 31, 41) of the segments (10, 20, 30, 40) corresponds to an advanced first ignition timing instant of the engine occuring a first time interval in advance of said reference position (TDC), and the second flank or edge (12, 22, 32, 42) corresponds to a second ignition timing instant occuring a second, shorter time interval before said reference position (TDC).

8. Combination according to claim 7, wherein the pick-up is magnetically sensitive, and the segmental disk comprises magnetically marked segments.

9. Combination according to claim 7, wherein the pick-up is optically sensitive, and the segmental disk comprises a rotating shutter disk.

10. Combination according to claim 7, wherein the angular offset is between about 2° to 5° of crankshaft angle of the engine.

11. Combination according to claim 10, in further combination with an engine control computer (3) having a program interrupt input (3f);

wherein said pick-up (2) provides an interrupt input to the computer upon sensing the first edge or flank (11, 21, 31, 41) of the segments, and provides a speed or count input to the computer upon sensing the second flank (12, 22, 32, 42) of the segments;

and wherein said computer includes a clock generator (6) and means (4, 5, 6, 7, 8, 9) for computing the length of the respective segments passing in front of the pick-up and providing an output signal if the comparison of two successive segments has a predetermined relationship.

12. Combination according to claim 11, wherein said computer includes a gating circuit (5) and a counter (7), said gating circuit being responsive to signals from said pick-up (2) and passing clock signals to said counter during presence of said segments (10, 20, 30, 40), and controlling storage of the resulting count, forming a representation of the length of said segment, in the memory (8);

said gate inhibiting passage of clock signals to the counter upon absence of the segments, and, upon occurrence of subsequent segment, causing said counter to count, said comparator comparing the contents of the memory with the contents of the counter upon receiving the last of the counting signals from the counter as determined by interruption of signals to the counter from the clock.

13. Combination according to claim 11, wherein said computer has a computation section for computation of the length of said segments, including a memory (8) having a memory capacity just sufficient to store a representation corresponding to the maximum length of any one of said segments;

and wherein said reference marker segment (10) has a lesser circumferential length than the other of said segments (20, 30, 40).

14. Combination according to claim 13, wherein said comparator provides an output upon sensing that a segment is shorter than an immediately preceding segment.

* * * * *

UNITED STATES PATENT AND TRADEMARK OFFICE
CERTIFICATE OF CORRECTION

PATENT NO. : 4,700,305

DATED : October 13, 1987

INVENTOR(S) : LOTTERBACH et al

It is certified that error appears in the above-identified patent and that said Letters Patent is hereby corrected as shown below:

Claim 1, line 1, delete "is" insert -- of --.

Signed and Sealed this

Twenty-eighth Day of February, 1989

Attest:

DONALD J. QUIGG

Attesting Officer

Commissioner of Patents and Trademarks